US008677634B2

(12) United States Patent
Nickels, Jr. et al.

(10) Patent No.: US 8,677,634 B2
(45) Date of Patent: Mar. 25, 2014

(54) POWER TOOLS

(75) Inventors: Richard C. Nickels, Jr., Hampstead, MD (US); David L. Wikle, York, PA (US); Tim Bowman, Essex, MD (US); James R. Parks, White Hall, MD (US); Jonathan D. Bigden, Baltimore, MD (US); Jeffrey Peck, Baltimore, MD (US); Mei Ling Cheng, Tai-chung (TW); Hung Jung Chaing, Tai-chung (TW); Chun Chieh Huang, Dali (TW)

(73) Assignee: Black & Decker, Inc., Newark, DE (US)

( * ) Notice: Subject to any disclaimer, the term of this patent is extended or adjusted under 35 U.S.C. 154(b) by 0 days.

(21) Appl. No.: 13/546,073

(22) Filed: Jul. 11, 2012

(65) Prior Publication Data

US 2013/0174427 A1 Jul. 11, 2013

Related U.S. Application Data

(60) Continuation of application No. 13/116,054, filed on May 26, 2011, now Pat. No. 8,245,408, which is a division of application No. 12/070,501, filed on Feb. 19, 2008, now Pat. No. 7,950,156.

(51) Int. Cl.
*B23D 45/00* (2006.01)

(52) U.S. Cl.
USPC ................................................ 30/388; 30/391

(58) Field of Classification Search
USPC ................ 30/371, 373, 375, 388, 391; D8/66
See application file for complete search history.

(56) References Cited

U.S. PATENT DOCUMENTS

| | | | | |
|---|---|---|---|---|
| 1,098,775 A | | 6/1914 | Wheelock | |
| 1,880,069 A | | 9/1932 | Becker | |
| 1,950,036 A | | 3/1934 | Preston | |
| 2,365,785 A | | 12/1944 | Tinnerman | |
| 2,841,192 A | * | 7/1958 | Martin | 30/377 |
| 2,945,085 A | | 7/1960 | Billups | |
| 3,056,852 A | | 10/1962 | Sachs | |
| 3,123,662 A | | 3/1964 | Fink | |
| 3,240,502 A | | 3/1966 | Snyder | |
| 3,262,471 A | * | 7/1966 | McCarty | 30/377 |
| 3,279,014 A | | 10/1966 | Fischer | |
| 3,371,691 A | * | 3/1968 | Ehinger | 30/390 |
| 3,546,502 A | | 12/1970 | Botefuhr et al. | |
| 3,689,014 A | | 9/1972 | Fink | |
| 3,958,300 A | | 5/1976 | Tanaka et al. | |
| 4,095,043 A | | 6/1978 | Martin et al. | |
| 4,289,923 A | | 9/1981 | Ebert | |
| 4,323,725 A | | 4/1982 | Muller et al. | |
| 4,353,165 A | * | 10/1982 | Albery | 30/376 |
| 4,389,082 A | | 6/1983 | Lingaraju | |

(Continued)

FOREIGN PATENT DOCUMENTS

DE 3820741 A1 12/1989

*Primary Examiner* — Hwei C Payer
(74) *Attorney, Agent, or Firm* — Michael Aronoff

(57) ABSTRACT

A power tool is provided with a perforated material remover to remove perforated material from power tool cutting implements. The power tool also includes a rip guide which has a long guide edge and two attachment points to the shoe/base of the saw. The rip guide is attached to the base/shoe via a pair of L-shaped openings that accept L-shaped support arms of the rip guide. The rip guide can also be folded for compact storage. The power tool also includes dual bevel scales for quickly and easily setting the bevel angle on the power tool.

1 Claim, 7 Drawing Sheets

(56) References Cited

U.S. PATENT DOCUMENTS

| | | | | | |
|---|---|---|---|---|---|
| 4,406,064 | A | | 9/1983 | Goss | |
| 4,589,208 | A | * | 5/1986 | Iwasaki et al. | 30/376 |
| 4,787,145 | A | | 11/1988 | Klicker et al. | |
| 4,870,758 | A | * | 10/1989 | Fushiya | 30/388 |
| 5,737,843 | A | * | 4/1998 | Fringer et al. | 30/391 |
| 5,850,698 | A | | 12/1998 | Hurn et al. | |
| D406,510 | S | * | 3/1999 | Nilsson et al. | D8/66 |
| 7,059,225 | B1 | | 6/2006 | Rabell | |
| 7,426,787 | B2 | * | 9/2008 | Tracy et al. | 30/391 |
| 7,950,156 | B2 | * | 5/2011 | Nickels et al. | 30/373 |
| 8,245,408 | B2 | * | 8/2012 | Nickels et al. | 30/388 |
| 2002/0020068 | A1 | * | 2/2002 | Hartmann | 30/388 |
| 2002/0023360 | A1 | * | 2/2002 | Zeiler et al. | 30/388 |
| 2002/0133954 | A1 | * | 9/2002 | Bruce et al. | 30/388 |
| 2008/0148915 | A1 | * | 6/2008 | Nickels et al. | 83/469 |
| 2013/0174427 | A1 | * | 7/2013 | Nickels et al. | 30/388 |

* cited by examiner

POWER TOOLS

This application is a continuation of U.S. patent application Ser. No. 13/116,054, filed on May 26, 2011, now U.S. Pat. No. 8,245,408, which is a divisional of U.S. patent application Ser. No. 12/070,501 filed on Feb. 19, 2008, now U.S. Pat. No. 7,950,156; the entire contents of which are hereby incorporated by reference.

FIELD OF THE INVENTION

The present disclosure relates to various improvements for power tools, and particularly to a perforated material remover, a saw rip guide, and bevel scales.

BACKGROUND AND SUMMARY OF THE INVENTION

The statements in this section merely provide background information related to the present disclosure and may not constitute prior art.

One aspect of the present invention includes an accessory that provides the user with functionality to quickly and easily remove perforated material from the power tool cutting element. Certain portable tool spindles have non-standard attachment interfaces preventing the attachments of standard cutting elements. To accommodate non-standard attachment interfaces, certain cutting elements have perforations that will change the standard attachment on the cutting element to one that will match the non-standard spindle. The present disclosure includes a perforated material remover that provides the user with functionality to quickly and easily remove perforated material from the power tool cutting element allowing the cutting element to be attached to the power tool.

According to another aspect of the present invention, rip guides are used as an accessory with portable saws to assist the user in making accurate rip cuts on a work piece. The present disclosure includes a rip guide having a long guide edge and two attachment points to the shoe/base of the saw. The rip guide accessory is attached to the base/shoe via a pair of L-shaped openings. The L-shaped openings are versatile in that they are compatible with existing rip guides and they accept the L-shaped support arms of the rip guide of the present disclosure. The L-shaped geometry provides a significant improvement in durability of the rip guide. The support arms can be fixed to the guide edge using a pivot connection, such as by bolts, to be folded to a more compact size for storage. Another alternate design allows the rip guide to be folded along its support arms and allows the support arms to slide with respect to the guide edge as well as each other to minimize the rip guide's dimensions when folded for storage.

According to yet another aspect of the present disclosure, power saws typically have the ability bevel to allow an angled cut into the workpiece. The present disclosure includes two bevel scales located on the castings associated with the saw shoe to provide the user with an accurate measurement scale to quickly and easily set the angle of cut. Preferably, the two bevel scales complement each other with one scale having a coarse measurement scale and the other bevel scale having a fine measurement scale.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE PREFERRED EMBODIMENTS

Figure 1:
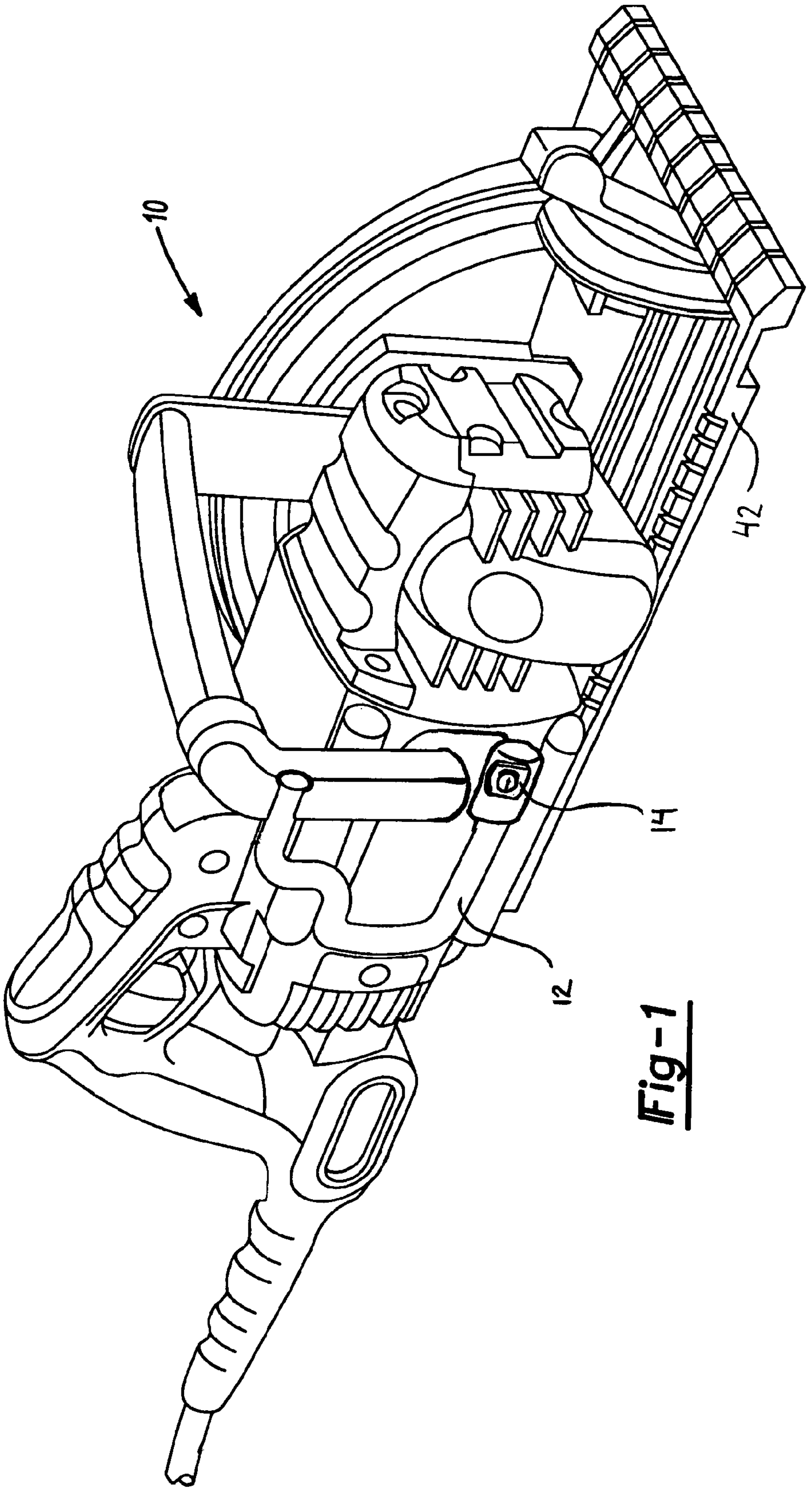
FIG. 1 is a perspective view of an exemplary worm drive saw with a perforated material remover on a tool hanger according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 1A:
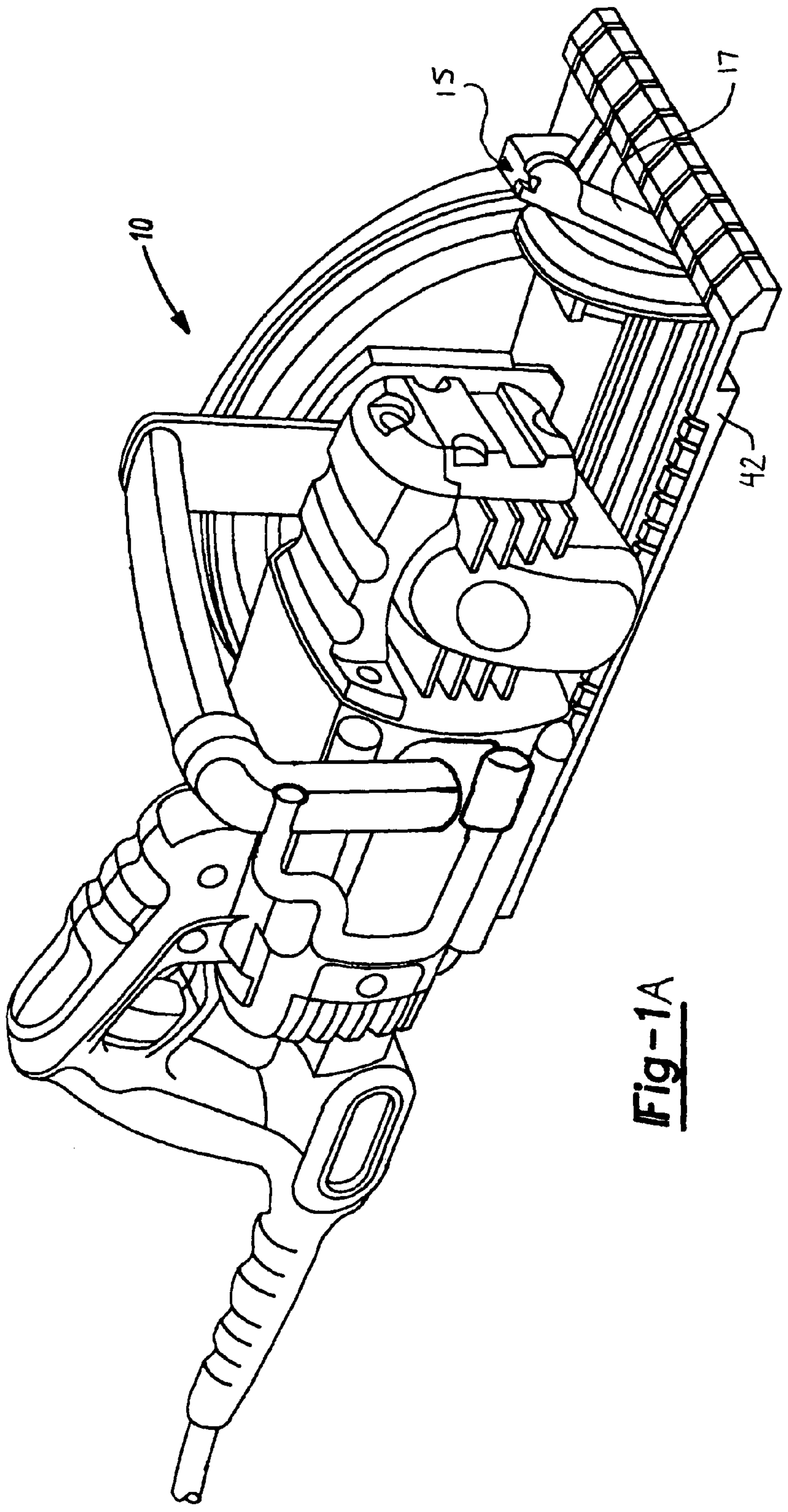
FIG. 1A is a perspective view of an exemplary worm drive saw with an alternative embodiment of the perforated material remover on a bevel lever according to the principles of the present disclosure

With reference to FIG. 1, an exemplary power tool 10 is shown including a hanger 12 pivotally attached to the tool to allow the hanger 12 to be moved between a use position and a non-use position. As illustrated in FIG. 1, attached to the hanger 12 is a perforated material remover 14. Although shown attached to the hanger 12, the perforated material remover 14 can be attached to any portion of the power tool 10. For example, FIG. 1A shows an alternative embodiment of a perforated material remover 15 attached to a bevel lever 17.

Figure 2:
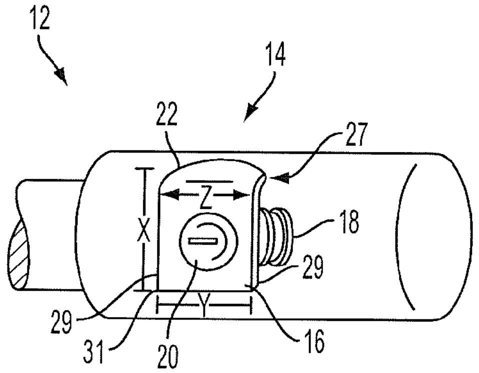
FIG. 2 is a partial perspective view of the perforated material remover on the tool hanger of the saw shown in FIG. 1.

Turning to FIG. 2, the perforated material remover 14 can be seen more clearly. In a preferred embodiment, the perforated material remover 14 includes a body portion 16 which is attached to a base portion 18 via a fastener 20. Although the fastener 20 is shown as a screw, the fastener 20 can be any type of fastener including nail, rivet, and adhesive or bonding agent. Alternatively, the perforated material remover 14 can be attached to the power tool 10 via an interlocking fit such as a tongue and groove or can be attached via a friction fit.

With continued reference to FIG. 2, the body portion 16 preferably includes a first dimension X and a second dimension Y perpendicular to the first dimension X and at a first end 27 of the first dimension X an arcuate upper portion 22 that is curved inwardly or towards the base portion 18. The arcuate upper portion 22 has a diameter Z equal to the second dimension Y. The body portion 16 also includes squared corners 29 at a second end 31 of the first dimension X, opposed to the arcuate upper portion 22. The base portion 18, in a preferred embodiment, is substantially smaller in the length and width dimensions when compared to the body portion 16 but is larger than the body portion 16 in height, thereby elevating the body portion 16 from the hanger 12. In a preferred embodiment, the body portion 16 is elevated from the hanger 12 so a cutting implement can be placed between the body portion 16 and the hanger 12.

Figure 2A:
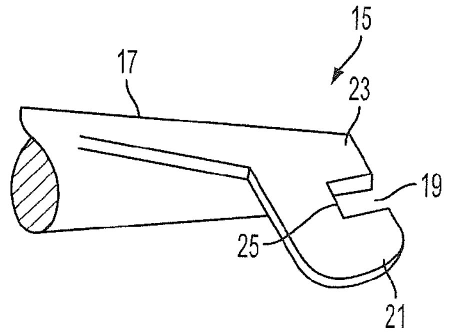
FIG. 2A is a partial perspective view of the alternative embodiment of the perforated material remover on the bevel lever of the saw shown in FIG. 1A.

In another preferred embodiment, the perforated material remover 15 is attached to the bevel lever 17. As shown in FIG. 2A, the perforated material remover 15 includes a notch-like opening 19 having a substantially squared-off shape. Although shown squared off, the opening 19 can have any shape including annular or triangular.

Figure 3:
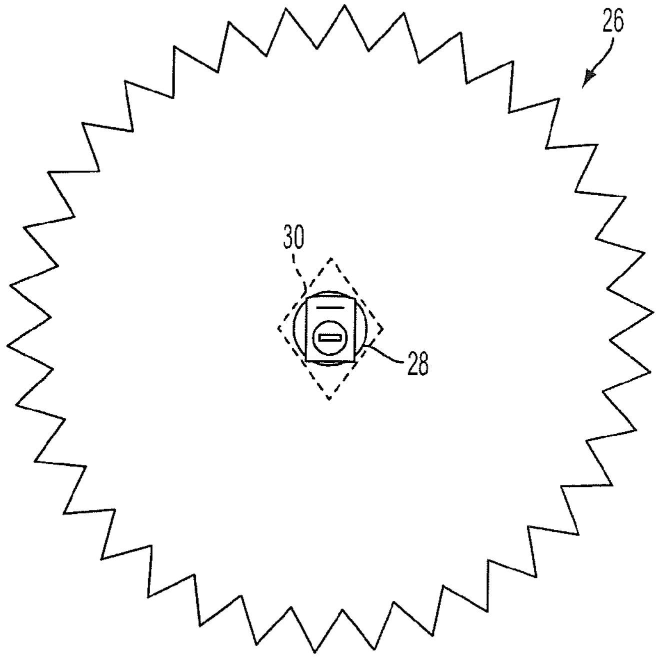
FIG. 3 is a partial perspective view of the perforated material remover of FIG. 2 engaged with a power tool cutting implement.

FIG. 3 illustrates the perforated material remover 14 in a use-position with the perforated material remover 14 engaging a power tool cutting implement 26. In an exemplary use, the perforated material remover 14 would be placed through a central opening 28 in the power tool cutting implement 26. The power tool cutting implement 26 would then be shifted laterally so that the body portion 16 can engaged the perforated portion 30 of the power tool cutting implement 26. A user would then push the power tool cutting implement 26 against the body portion 16, and more specifically, against the arcuate upper portion 22 of the body portion 16. The force of pushing the power tool cutting implement 26 against the body portion 16 of the perforated material remover 14 will result in the perforated material 30 detaching from the power tool cutting implement 26 at the points of perforation.

Similarly, for the perforated material remover 15, in an exemplary usage, the user would place a portion of the perforated material remover 15 through a central opening 28 in the power tool cutting implement 26 so that a first end 21 of the perforated material remover 15 is located on a first side of the power tool cutting implement 26 and a second end 23 of the perforated material remover 15 is located on a second side of the of the power tool cutting implement 26. The power tool cutting implement 26 would then be shifted laterally so that the back end 25 of the opening 19 abuts an edge of the opening 28 of the power tool cutting implement 26. A user would then push the power tool cutting implement 26 against either end 21 or 23 of the perforated material remover 15. The force of pushing the power tool cutting implement 26 against either end 21 or 23 of the perforated material remover 15 will result in the perforated material 30 detaching from the power tool cutting implement 26 at the points of perforation.

Figure 4:
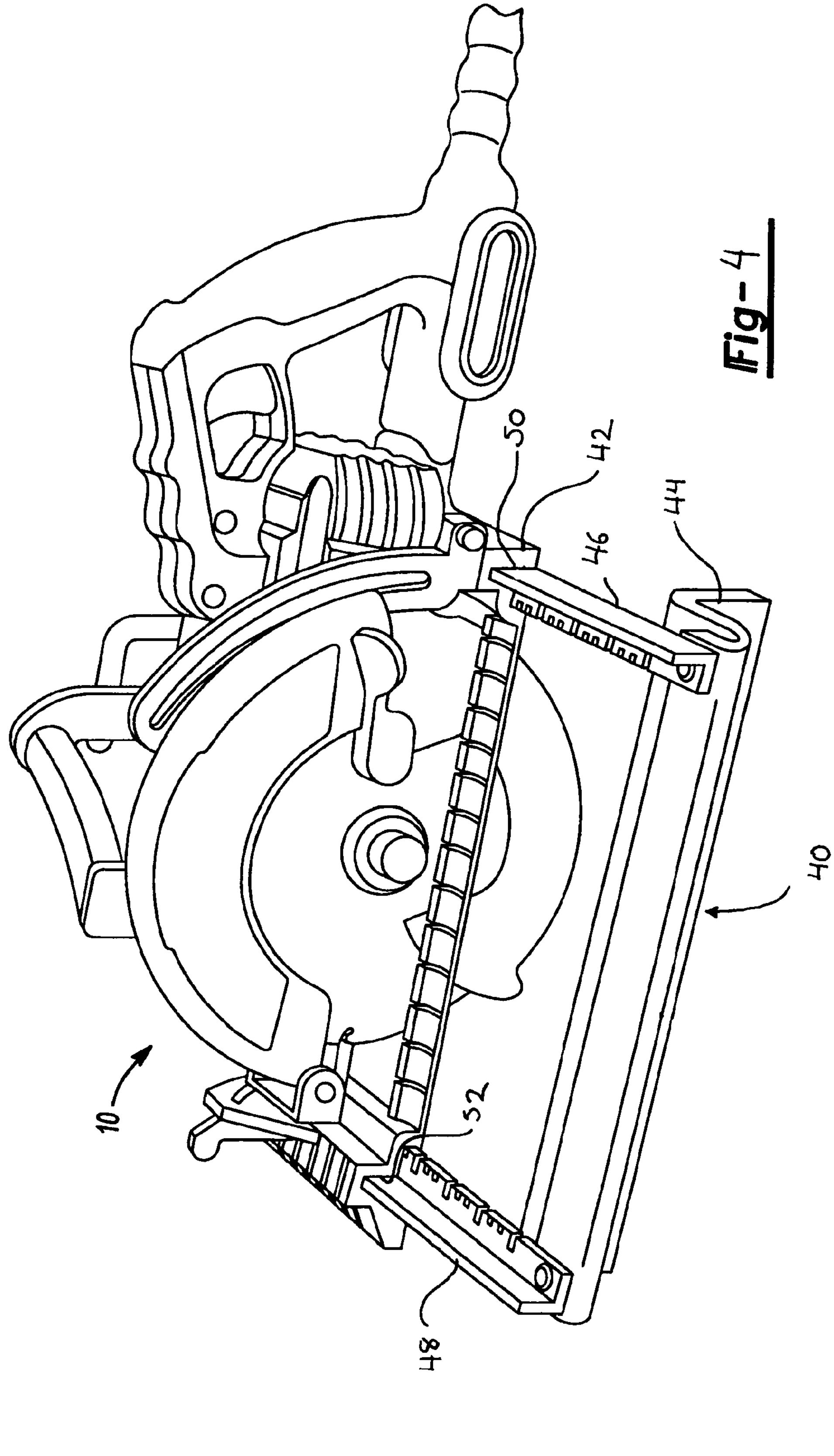
FIG. 4 is a perspective view of an exemplary saw and rip guide according to the principles of the present disclosure.

With reference to FIG. 4, the saw 10, according to the principles of the present disclosure is shown provided with a rip guide 40 adjustably mounted to the saw shoe 42. The rip guide 40 includes an elongated guide edge 44 supported by a pair of support arms 46, 48. The support arms 46, 48 are provided with a substantially L-shaped cross-section and are received in substantially L-shaped openings 50, 52 provided in the saw shoe 42. The L-shaped cross-section of the support arms 46, 48 provides a significant improvement in durability of the rip guide 40 by providing added structural strength thereto. The L-shaped support arms 46, 48 also improve piloting and stability of the rip guide with respect to the saw shoe 42. Alternatively, other shaped support arms such as a T-shaped, I-shaped, C-shaped, vertical flat, or horizontal flat cross-section can also be used. The interface between the openings 50, 52 and the support arms can have a "keyed" interface wherein the interface has a horizontal pattern and a vertical pattern. The corresponding L-shaped, T-shaped, I-shaped, and C-shaped openings 50, 52 provided in the saw shoe 42 also accommodate the flat cross-section support arms that have been used with conventional rip guides. In a preferred embodiment, the support arms 46, 48 may also include a measurement scale 53 thereon.

Figure 5:
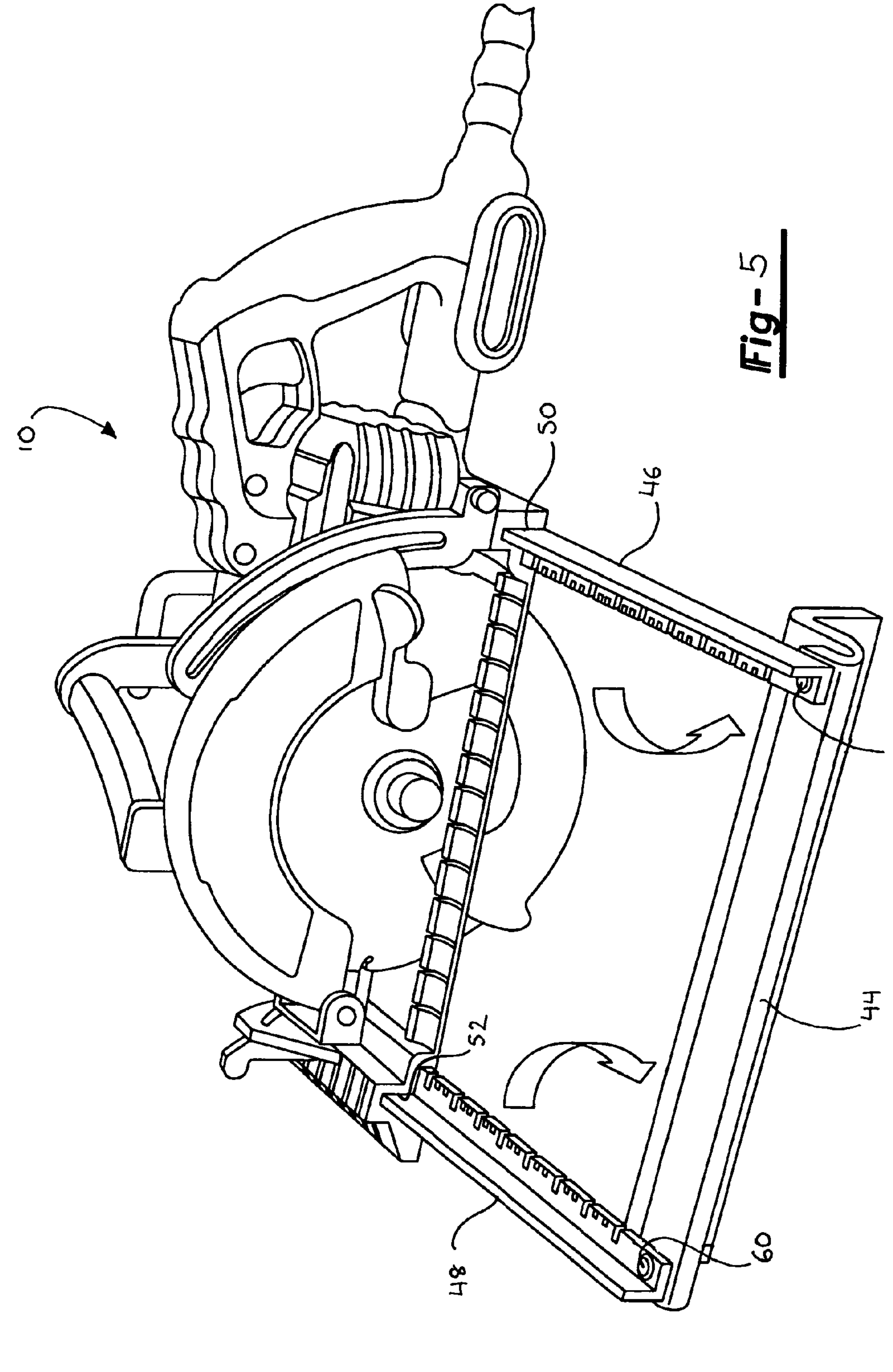
FIG. 5 is a perspective view of a saw and alternative embodiment of the rip guide according to the principles of the present disclosure.

As illustrated in FIG. 5, the support arms 46, 48 can be fixedly connected to the guide edge 44 such as by soldering, welding, or other known fastening techniques. Alternatively, as shown in FIG. 5, the support arms 46, 48 can be connected to the guide edge 44 by pivot connections 60 such as by rivets or other pivot fasteners which allow the support arms to be folded relative to the guide edge 44 for compact storage.

Figure 6:
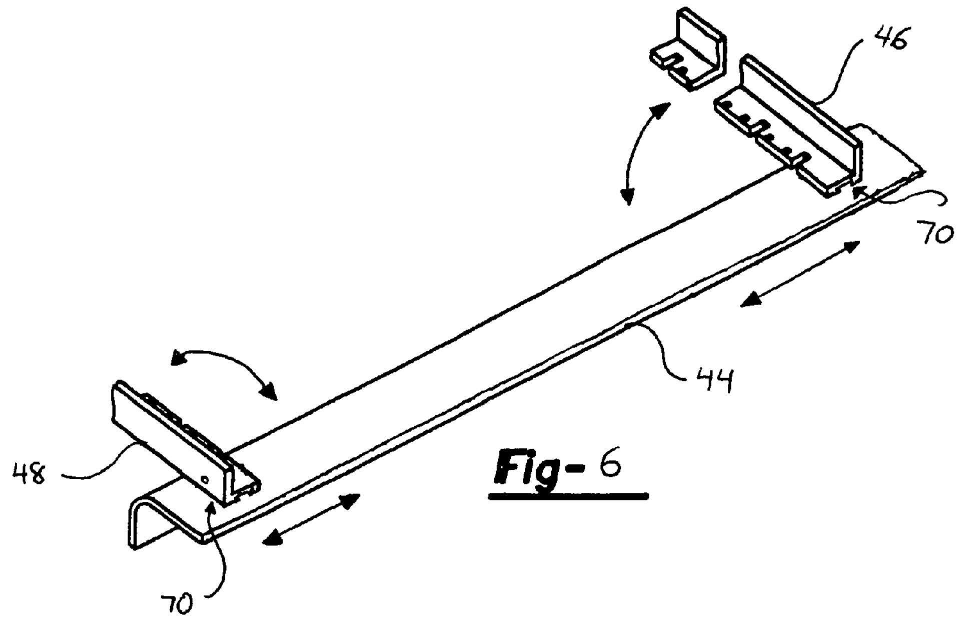
FIG. 6 is a perspective view of another alternative embodiment of the rip guide with the rip guide removed from the exemplary saw.

According to another alternate embodiment, as illustrated in FIG. 6, the support arms 46, 48 can be connected by connections 70 which allow the support arms to be folded relative to the guide edge 44 for more compact storage. The following descriptions discusses only one connection 70 and support arm 48, but those of ordinary skill in the art understand that the same connection 70 applies with respect to the guide edge 44 and the other support arm 46. Looking at FIGS. 6, 7, and 8, connection 70, in a preferred embodiment, includes a bolt 72 with a substantially trapezoidal-shaped head portion 74, a biasing member 76, and a knob 78. Preferably, the support arm 48 is modified in this embodiment to include slots 80 which extend along at least a portion of the length of the support arm 48.

In a preferred embodiment, the slot 80 is configured and dimensioned to match the shape of the head portion 74 of the bolt 72 to allow the bolt 72 to slide along the slot 80 without disengaging from the slot 80. Although the head portion 74 of the bolt 72 is preferably substantially trapezoidal in shape, any shape can be used for the head portion 74, including circular, rectangular, or squared.

In a further preferred embodiment, the support arm 48 also includes pins 82 which are located at either end of the support arm 48. Pins 82, when engaged to support arm 48, prevent the removal of bolt 72 from slot 80 by abutting the head portion 74 of the bolt 72 thereby preventing the sliding of the bolt 70 out of either end of the slot 80 at the ends of the support arm 48.

Figure 7:
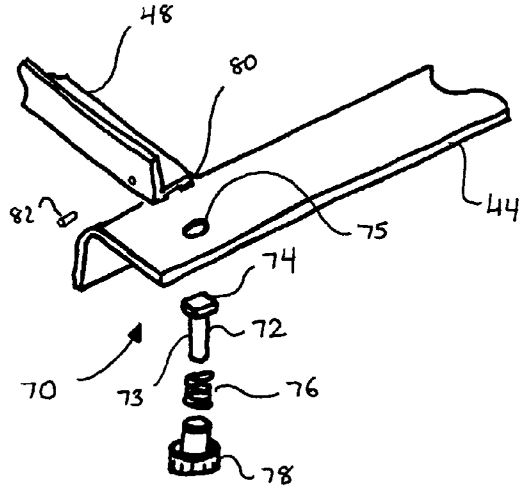
FIG. 7 is a partial exploded view of the rip guide of FIG. 6.
Figure 8:
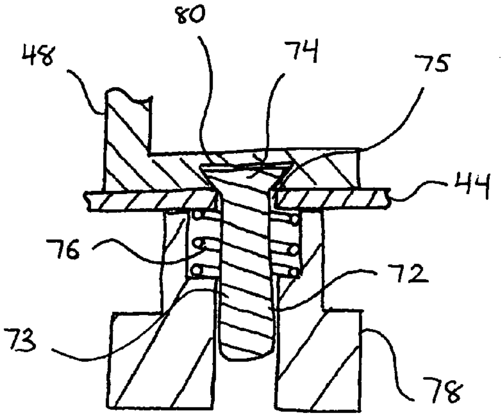
FIG. 8 is a partial cross-sectional view of the rip guide of FIG. 6.

With continued reference to FIGS. 6, 7, and 8, the shaft 73 of the bolt 72 is received through an opening 75 on the guide edge 44 and the knob 78 is received on the shaft 73 of bolt 72 that extends through the opening 75 of the guide edge 44. Preferably, the biasing member 76 is located around the portion of the shaft 73 that extends through the opening 75 of the guide edge 44 and inside a portion of the knob 78, abutting the guide edge 44 on one end and abutting the knob 78 on the other end. In a preferred embodiment, the shaft 73 of bolt 72 is threaded and knob 78 includes complementary threading to threadingly engage the shaft 73 of bolt 72. In alternate preferred embodiments, the knob 78 can engage the shaft 73 of bolt 72 through a variety of means including friction fit or other movable engagement. The head portion of the knob 78 may include surface treatments such as knurls or ridges to facilitate gripping by a user.

In an exemplary use, connection 70 allows support arm 48 to pivot and slide with respect to guide edge 44 to allow for more compact storage. When connection 70 is tightened or in a locked position, the support arm 48 is prevented from moving with respect to the guide edge 44. This is accomplished by the head portion 74 of the bolt 72 being pushed against a lower edge of the slot 80 of the support arm 48. The support arm 48 is, in turn, pushed against one side of the edge guide 44. On the opposite side of the guide edge 44, the knob 78, which engages the bolt 72 via shaft 73, pushes against the other side of the guide edge 44 clamping the guide edge 44 and support arm 48 together. The biasing member 76 applies an additional locking force by pushing against the other side of the guide edge 44 on one side and by pushing on the knob 78 on its other side.

In order to pivot and slide the support arm 48 with respect to the guide edge 44, a user would turn the knob 78, loosening the knob 78 from the shaft 73 of bolt 72. By loosening the knob 78, the biasing member 76, which normally is compressed and pushes against one side of guide edge 44 and knob 78, is uncompressed reducing the locking force applied by the biasing member 76. Also by loosening the knob 78 from the bolt 72, knob 78 no longer pushes against one side of guide edge 44 removing the clamping force applied to guide edge 44 and support arm 48. Support arm 48 can now pivot with respect to guide edge 44 and can slide with respect to guide edge 44.

Figure 9:
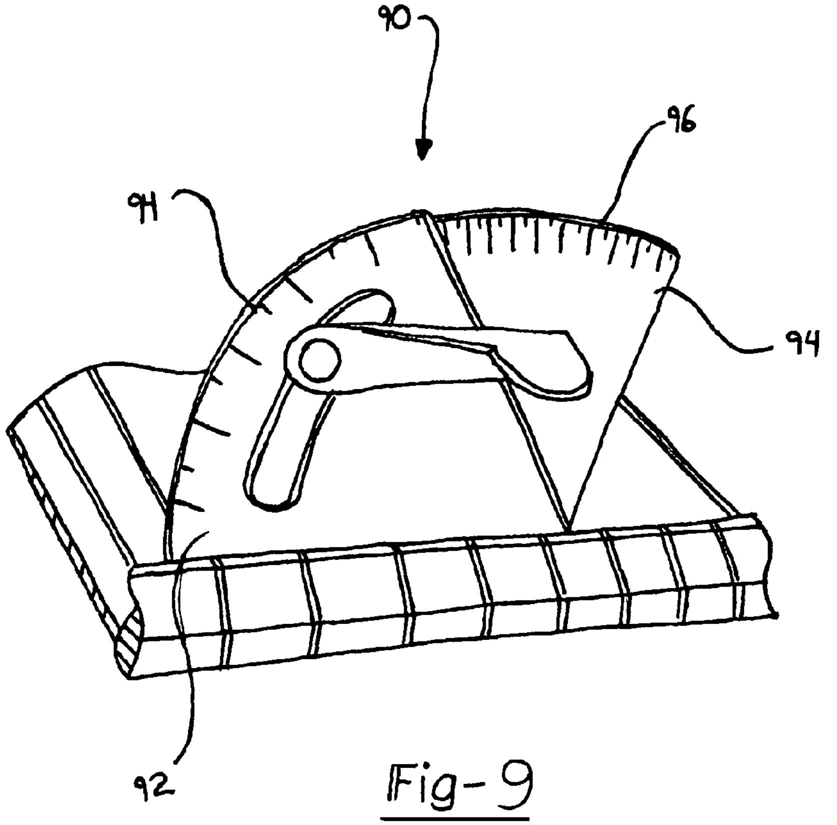
FIG. 9 is a partial perspective view of the bevel pivot brackets of the saw shown in FIG. 1.

With reference to FIG. 9, dual bevel scales 90 are shown for aiding the user in quickly and accurately setting a bevel angle on the power tool. As illustrated in FIG. 1, the power tool 10 includes a saw shoe 42 which supports the power tool 10 along the bottom end of the tool. As is typical of saws, the saw shoe 42 can bevel or pivot with respect to the remainder of the power tool 10 to allow a user to cut into a workpiece at an angle. In a preferred embodiment, the saw shoe 42 includes a front casting 92 having a first adjustment scale 94 which includes a coarse scale with commonly used bevel angles. The saw shoe 42 also includes a bevel pivot casting 95, located behind the front casting 92, that has a second adjustment scale 96 which include a fine scale. Preferably, the first adjustment scale 94 allows for 5 degrees of accuracy and the second adjustment scale 96 allows for 1 degree of accuracy.

As can be seen in FIG. 9, the first and second adjustment scales 94, 96, are located on an outwardly or forwardly facing side of the casting 92 and pivot bracket 94. This placement allows for maximum user visibility.

In an exemplary use of the dual bevel scales 90, a user uses the first adjustment scale 94 to quickly ascertain a coarse adjustment or commonly used bevel angle. If the desired use requires a fine adjustment or uncommonly used bevel angle, the user then refers to the second adjustment scale 96 to quickly ascertain the desired bevel angle.

The description of the invention is merely exemplary in nature and, thus, variations that do not depart from the spirit of the invention are intended to be within the scope of the invention. Such variations are not to be regarded as a departure from the spirit and scope of the invention.

What is claimed is:

1. A power saw, comprising:

a saw body;

a saw blade; and a material remover coupled to said saw body, the material remover including a body portion, the body portion (1) having a first dimension and a second dimension perpendicular to the first dimension and (2) having at a first end of the first dimension an arcuate portion, the arcuate portion being distanced from but curved towards the saw body and having a diameter equal to the second dimension and at a second end of the first dimension, opposed to the arcuate portion, a generally squared portion, the squared portion being distanced from the saw body and having a width of the second dimension, the second dimension being such that the arcuate portion is able to be inserted through a central opening of the saw blade and the first dimension being such that, upon insertion of the arcuate portion through the central opening and lateral shifting of the saw blade, the arcuate portion engages a first side of the saw blade and the generally squared portion engages a second side of the saw blade.

* * * * *